April 12, 1966

D. C. PURDY ETAL 3,245,879

COMPACT NUCLEAR STEAM GENERATOR

Filed Nov. 29, 1963

INVENTORS
David C. Purdy
BY Earl E. Schoessow

ATTORNEY

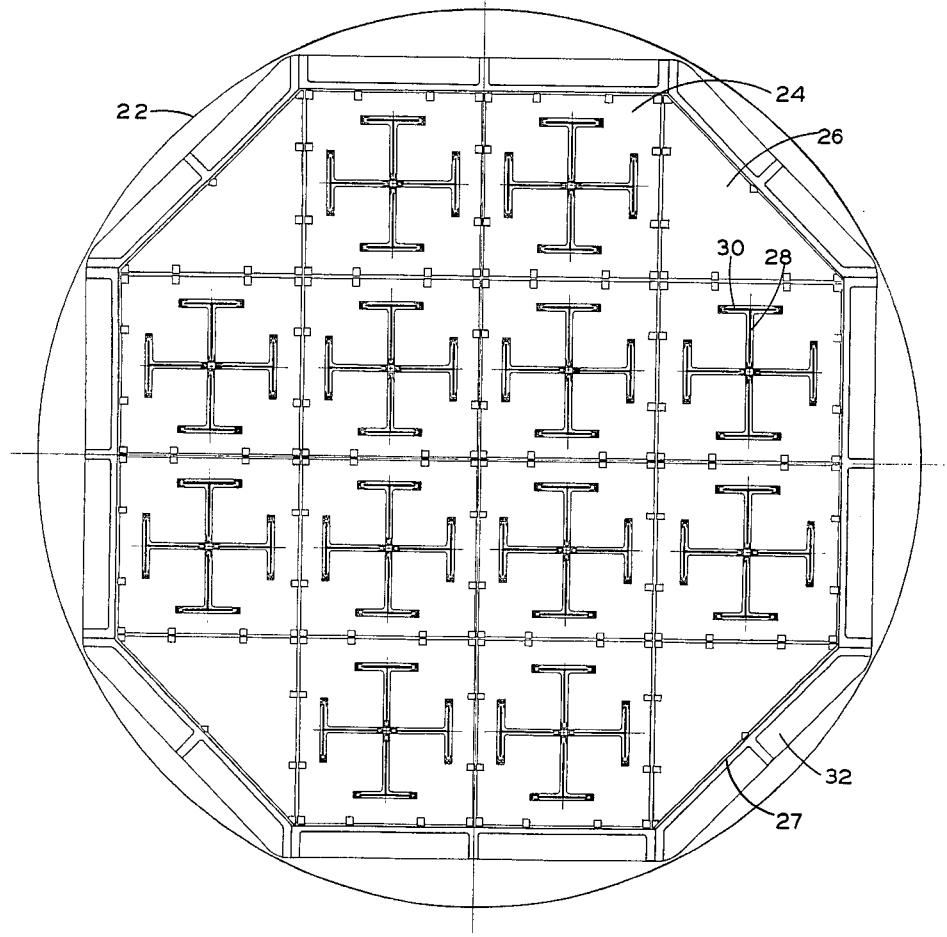

3,245,879
COMPACT NUCLEAR STEAM GENERATOR
David C. Purdy and Earl E. Schoessow, Lynchburg, Va., assignors to The Babcock & Wilcox Company, New York, N.Y., a corporation of New Jersey
Filed Nov. 29, 1963, Ser. No. 326,875
8 Claims. (Cl. 176—36)

The present invention relates to a compact nuclear reactor plant and more particularly to a compact plant utilizing forced circulation of the primary coolant through a closed circuit in the reactor.

By employing nuclear rather than conventional power sources in ocean-going vessels, it is possible to achieve long-term periods of operation without refueling. However, the size and complexity of nuclear power plants have posed problems in attaining economical operation in marine propulsion, as compared with that available in conventional marine plants. In the area of marine propulsion there has been a concerted effort to reduce the overall size of the reactor plant and its containment while increasing the power output. An example of such a reactor plant may be found in the Patent No. 3,151,034 issued September 29, 1964, on a Consolidated Nuclear Steam Generator by R. M. Douglass et al. The present invention provides a further step in the reduction of the overall size and complexity of the plant disclosed in the above application. While the present application is more directly concerned with marine propulsion, the arrangement it discloses may also be utilized in land based power generating stations.

Therefore, it is a primary object of this invention to afford a compact once-through steam generating reactor plant which employs forced circulation of the primary coolant through a closed circuit within the reactor itself.

In the present invention the primary system is disposed entirely within the reactor vessel. Primary coolant fills the vessel so that a liquid level is provided in its upper region. Below the liquid level a vertically positioned cylinder extends downwardly to the base of the vessel. Arranged in the upper half of the cylinder are a number of fuel elements which act as the core.

Secondary coolant is circulated through the reactor in a plurality of tubes helically coiled about the cylinder. The tubes are located about and extend to a point below the core. At its upper end the space in which the tubes are located is closed off by a plate which prevents the inflow of primary coolant.

Inlet and outlet headers are arranged in the head of the reactor vessel above the level of the primary coolant. The inlet tubes extend downwardly along the wall of the vessel to the lower end of the helically coiled steam generating tubes, while the outlet tubes extend from the upper ends of the steam generating tubes to the outlet headers. Extending from the plate closure on top of the space containing the steam generating tubes to the outlet header is a passageway formed by vertically arranged wall means which encloses the outlet tubes.

Walls in combination with the plate closure form a plenum chamber. Openings are arranged in the walls so that primary coolant will flow into the plenum chamber after its passage over the core fuel elements. Pumps are mounted on the top of the vessel with the inlet pumps extending into the plenum chamber and the pump discharge opening to the space containing the steam generating tubes.

Primary coolant circulates upwardly through the cylinder passing over and removing heat from the fuel elements. Next the heated primary coolant enters the plenum chamber and then is sucked up into the pump. From the pump the primary coolant flows downwardly in counter-current flow relationship with the secondary coolant passing through the helically coiled tubes. After passing over the tubes, the coolant continues downwardly to the lower portion of the cylinder and completes its cycle by flowing into the cylinder through openings formed in its walls.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there has been illustrated and described preferred embodiments of the invention.

Of the drawings:

FIG. 2 is a horizontal view of the reactor core showing the general arrangement of fuel elements and control rods within the reactor plant of FIG. 1.

Figure 1:
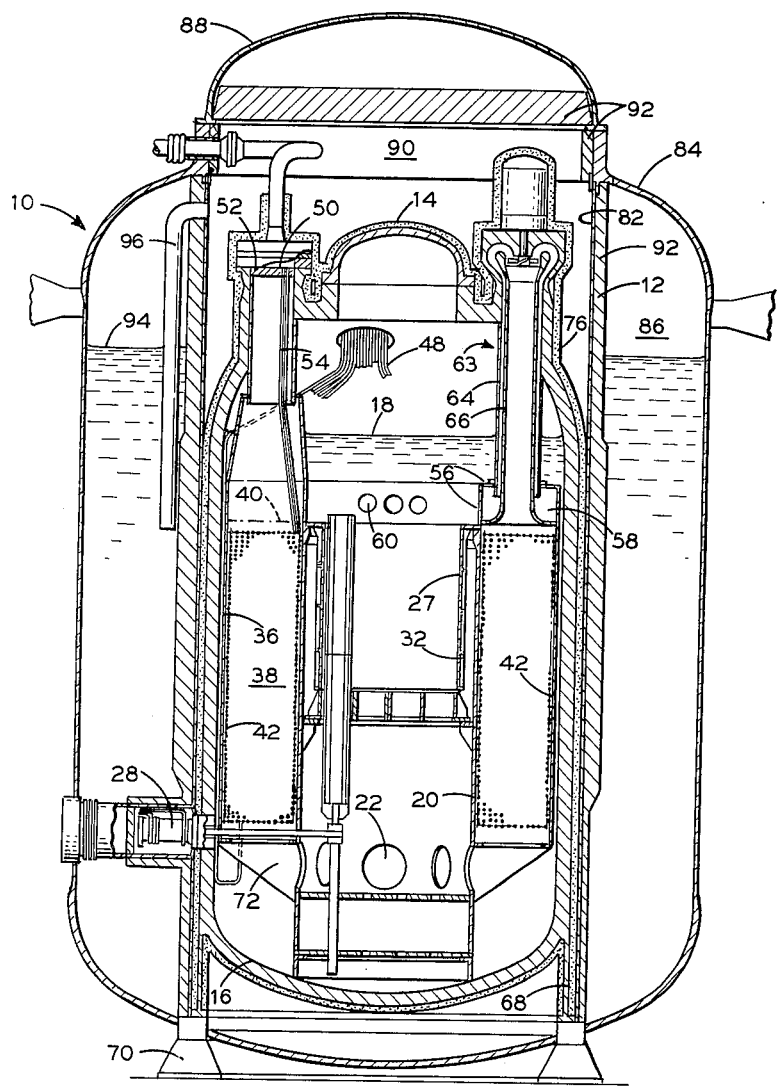
FIG. 1 is a vertical section of a compact nuclear reactor power plant.

In the nuclear reactor plant 10, illustrated in FIG. 1, the primary coolant system is contained within a vertically positioned pressure vessel 12. At its upper end, the vessel 12 has a removable refueling port 14 which yields access to the reactor core. The lower end of the vessel is closed by an integrally attached curved base 16.

Primary coolant fills most of the vessel 12 providing a liquid level 18. Centrally located within the vessel is an open-ended vertically arranged cylinder 20 whose lower end is supported upon the vessel's base 16. Near its lower end a number of openings 22 are disposed in the cylinder 20.

The core in which the fission reaction takes place is provided by a plurality of square fuel elements 24 and triangular fuel elements 26, shown in FIG. 2, arranged in a regular lattice and positioned in the upper half of the cylinder 20. Closely disposed about the fuel elements and extending for the height of the core is a wall 27 situated within the cylinder.

Horizontally disposed control rod drives 28 are mounted in the side of the vessel below the core with the control rods 30 extending upwardly into the core. A rack and pinion arrangement (not shown) is employed for driving the control rods 30. Each of the square fuel elements 24 contains four T-shaped control rods 30, as illustrated in FIG. 2. It will be noted that the triangular fuel elements 26 are located at the corners of the core and do not contain control rods. Below the drives 28 a pair of horizontally arranged plates 31 act as guides for the control rods 30. Filler plates 32 extend radially from the wall 27 for limiting the flow of coolant passing upwardly about the core.

Within and closely spaced from the vessel is a shroud 36 concentrically arranged about the cylinder 22. With its top located approximately at the top of the core, the shroud extends downwardly to a point located below the core. In combination with the cylinder the shroud forms an annular flow space 38 which is closed at its top by a horizontally disposed annular-shaped wall section 40, shown in phantom, extending between the cylinder and the shroud.

Located in the flow space 38 is a plurality of vertically extending helically coiled steam generating tubes 42. The tubes 42 are closely spaced and form the reactor plant steam generator through which the secondary coolant passes. Inlet headers and outlet headers 50 are located in the top of the reactor vessel. Though only the opening in the vessel leading to the inlet header is shown, the inlet headers are of substantially the same construction as the outlet headers 50. Inlet tubes 48 extend downwardly from the inlet headers and are connected to the lower ends of the steam generating tubes 42. As the inlet tubes 48 enter the vessel, they are directed downwardly along its inner wall passing between the vessel and the outer face of the shroud 36. Below the shroud 36 the inlet tubes are bent radially inward and then upward and are connected into the steam generating tubes.

The outlet headers 50 each have a tube sheet 52 which secures the ends of the outlet tubes 54. From the tube sheet 52 the outlet tubes 54 extend downwardly and are connected to the upper ends of the helically coiled steam generating tubes. Upstanding walls 55 enclose the outlet tubes 54 from the top of the flow space 38 to their connection into the tube sheet 52.

In combination with wall section 40, partitions 56 and the top portion of the shroud 36 form an inlet plenum chamber 58. Openings 60 are located in the partitions 56 so that primary coolant can flow into the plenum chamber 58.

While FIG. 1 shows only one pump 62 mounted on the top of the reactor vessel, actually a plurality of pumps would be utilized. From the pump 62 a concentrically arranged double conduit 63 extends downwardly into the vessel. At its lower end the outer conduit 64 is connected into the plenum chamber. However, the lower end of the inner conduit 66 extends through the plenum chamber and opens into the flow space 38. Primary coolant is drawn upwardly through outer conduit 64 from the plenum chamber 58 into the pump. From the pump the coolant is forced downwardly through the inner conduit 66 into the flow space 38 where it continues its downward passage over the steam generating tubes 42.

A support skirt 68 extends downwardly from the base of the vessel and bears against the bottom support pedestals 70. Within the vessel support members 72, attached to the cylinder, extend radially outward and afford support for the lower end of the shroud 36.

A layer of insulation 76 is molded about the pressure vessel. About the insulation is positioned an inner containment wall 80 which extends upwardly from support pedestals 70 to a point above the top of the pressure vessel. At its upper end the inner containment wall 80 is attached to an outer containment wall 84. From its point of connection of the inner containment wall 82, the outer containment wall first bows outwardly away from the vessel and then downwardly forming an outer containment chamber 86 enclosing the inner containment wall and the reactor vessel. Positioned on top of the outer containment wall 84 is a containment dome 88 which forms a cover for an inner containment chamber 90 formed in combination with the inner containment wall 82. About the outer surface of the inner containment wall and disposed transversely across the dome 88 is shielding 92.

In the outer containment chamber 86 water, acting as a biological shield, is maintained at a height above the top of the core and provides a liquid level 94. Pressure suppression pipe 96 is connected at its upper end into the inner containment chamber 90 and its lower end disposed below the liquid level 94. The quantity of water in the outer containment chamber is maintained so that any vapor build-up caused by leakage from the pressure vessel into the inner containment chamber 90 will be condensed in the outer containment chamber 86. Therefore, the containment need only be designed for relatively low pressures, and, as a consequence, a considerable reduction in the weight of the containment is achieved.

As mentioned earlier, during reactor operation the primary coolant is pumped through the reactor. Starting with the discharge conduit 66 from the pump, the primary coolant flows downwardly through flow space 38 in heat exchange relationship with the steam generating tubes 42. Below the tubes the primary coolant flows through the openings 22 into the lower end of the cylinder 20. Within the cylinder the primary coolant reverses direction, flowing upwardly over the fuel elements 24 and 26 and then passing into the plenum chamber 58 through the openings 60. From the plenum chamber primary coolant is sucked up into the pump and completes its forced circulation path through the vessel.

Secondary coolant enters the vessel through inlet headers and flows downwardly along the inner wall of the vessel through the inlet tubes 48. From the inlet tubes it passes into the lower ends of the steam generating tubes 42 and flows upwardly therethrough in a helical path. After completing its passage through the steam generating tubes the secondary coolant flows into the outlet tubes 54 and thence upwardly into the outlet header 50 for delivery to a point of use. Within the steam generating tubes the secondary coolant is first vaporized and then superheated. Since the secondary coolant vapor is in a superheated condition when it leaves the reactor vessel, separating equipment is not needed and a considerable saving in equipment and space is effected.

In order to pressurize the primary coolant a gas overpressure is introduced into the space above the liquid level in the pressure vessel 12.

The plant, such as is shown in FIG. 1, could be contained within an overall space having a height of thirty-six feet and a diameter including the containment of twenty-five feet.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A compact nuclear reactor arranged for forced circulation of the primary coolant therethrough comprising:
    (A) a vertically arranged pressure vessel,
    (B) a body of primary coolant contained within said pressure vessel and forming a liquid level located in upper portion of the vessel,
    (C) a vertically extending cylinder disposed within and spaced from said vessel situated below said liquid level, said cylinder having openings in its upper and lower ends for circulating primary coolant therethrough,
    (D) a plurality of fuel elements arranged in a regular lattice to form a core and located within the upper portion of said cylinder below its upper end,
    (E) control rods vertically positioned within said core,
    (F) horizontally disposed control rod drives mounted on the exterior side wall of said vessel, said drives extending interiorly of the vessel and attached to said control rods below said core,
    (G) a cylindrically shaped shroud situated within said vessel below said liquid level and concentrically arranged about said cylinder, said shroud and cylinder combining to form an annular flow space,
    (H) a plate section extending across the upper ends of said shroud and cylinder and forming a closure for the upper end of said flow space,
    (I) a bank of vertically extending vapor generating and superheating tubes disposed in said flow space, said bank of tubes being laterally coextensive with and extending downwardly below said core.
    (J) inlet means extending downwardly from the upper end of said vessel for supplying feed fluid to the lower ends of said bank of tubes,
    (K) outlet means extending downwardly from the upper end of said vessel for removing superheated vapor from the upper ends of said bank of tubes,
    (L) partitions in combination with said plate section forming an annular plenum chamber located above said flow space and below said liquid level, said partitions having openings therethrough for admitting primary coolant from within said cylinder into said plenum chamber, (M) a pump mounted on the upper end of said pressure vessel above said liquid level, (N) a concentrically arranged double conduit connecting the intake of said pump with said plenum chamber and the discharge from said pump with said flow space, thereby providing a flow path for the forced circulation of primary coolant through said reactor whereby coolant flows upwardly within said cylinder through the core then into the plenum chamber and in a closed path from the plenum chamber into the pump and then downwardly over the bank of tubes in the flow space finally passing into the lower end of said cylinder for recirculation up through said core.

2. A compact nuclear reactor plant as set forth in claim 1 wherein a refueling port is disposed centrally in the upper end of said pressure vessel and being of sufficient size for permitting access to and removal of said core.

3. A compact nuclear reactor plant as set forth in claim 1 wherein said inlet tubes within said pressure vessel extend downwardly along the inner wall thereof passing between said shroud and vessel to below the lower end of said shroud and there being bent radially inward for connection to the lower ends of said steam generating tubes.

4. A compact nuclear reactor plant as set forth in claim 1 wherein plate means are connected at their lower end to the top of said flow space and extending upwardly to said outlet header and forming a closure about the outlet tubes within said vessel.

5. A compact nuclear reactor plant as set forth in claim 4 wherein the steam generating tubes are helically coiled about said cylinder for the full extent of their length between said inlet and outlet tubes.

6. A compact nuclear reactor plant as set forth in claim 1 wherein vertically extending inner and outer containment walls and a transversely arranged containment dome member combine to form an inner containment chamber incorporating said vessel, said outer vertically extending containment wall spaced outwardly from said inner containment wall for most of its height and connected to it and to the containment dome member in combination therewith an annularly-shaped laterally disposed outer containment chamber extending for at least the height of said pressure vessel.

7. A compact nuclear reactor plant as set forth in claim 6 wherein a body of water is located in the outer containment chamber to a level above the core within the vessel for providing biological shielding means.

8. A compact nuclear reactor plant as set forth in claim 7 wherein a vapor suppression pipe is located within said outer containment chamber having one end located below the water level in said chamber and its other end opening to said inner containment chamber.

References Cited by the Examiner

UNITED STATES PATENTS

| 3,012,547 | 12/1961 | Ostergaard et al. | 176—65 |
| 3,115,450 | 12/1963 | Schanz. | |
| 3,150,051 | 9/1964 | Ammon | 176—65 |
| 3,151,034 | 9/1964 | Douglass et al. | 176—65 |

FOREIGN PATENTS

| 1,314,117 | 11/1962 | France. |
| 800,385 | 8/1958 | Great Britain. |
| 911,135 | 11/1962 | Great Britain. |

OTHER REFERENCES

Chemical & Engn. News, vol. 39, #28, July 10, 1961, pp. 21 and 22, 176–38.

Nuclear Power, January 1960, page 108.

REUBEN EPSTEIN, *Primary Examiner.*

L. DEWAYNE RUTLEDGE, CARL D. QUARFORTH,
*Examiners.*